(12) United States Patent
Sunde

(10) Patent No.: US 7,124,817 B1
(45) Date of Patent: Oct. 24, 2006

(54) METHOD OF TREATING A HYDROCARBON BEARING FORMATION

(75) Inventor: Egil Sunde, Sandnes (NO)

(73) Assignee: Statoil ASA, Stavanger (NO)

( * ) Notice: Subject to any disclaimer, the term of this patent is extended or adjusted under 35 U.S.C. 154(b) by 443 days.

(21) Appl. No.: 10/129,495

(22) PCT Filed: Nov. 3, 2000

(86) PCT No.: PCT/GB00/04222

§ 371 (c)(1),
(2), (4) Date: Sep. 23, 2002

(87) PCT Pub. No.: WO01/33041

PCT Pub. Date: May 10, 2001

(30) Foreign Application Priority Data

Nov. 4, 1999 (GB) ................................ 9926156.2

(51) Int. Cl.
*E21B 43/22* (2006.01)
(52) U.S. Cl. ...................... 166/246; 435/281
(58) Field of Classification Search ............... 166/246, 166/268, 275; 435/262, 262.5, 281, 282
See application file for complete search history.

(56) References Cited

U.S. PATENT DOCUMENTS

| | | | |
|---|---|---|---|
| 2,907,389 A | 10/1959 | Hitzman | |
| 3,105,014 A * | 9/1963 | Harrison | ..................... 166/246 |
| 3,332,487 A | 7/1967 | Jones | |
| 4,456,067 A | 6/1984 | Pinner | |
| 4,660,645 A | 4/1987 | Newlove | |
| 4,670,166 A | 6/1987 | McDougall | |
| 4,906,575 A | 3/1990 | Silver | |
| 4,986,354 A | 1/1991 | Cantu | |
| 5,044,435 A | 9/1991 | Sperl | |
| 5,083,611 A | 1/1992 | Clark | |
| 5,163,510 A * | 11/1992 | Sunde | ..................... 166/246 |
| 5,340,376 A * | 8/1994 | Cunningham | ..................... 71/6 |
| 5,753,122 A * | 5/1998 | Taylor et al. | ............... 210/611 |
| 6,331,300 B1 * | 12/2001 | Dybas et al. | .............. 424/93.4 |

FOREIGN PATENT DOCUMENTS

| | | |
|---|---|---|
| GB | 2231602 | 11/1990 |
| WO | 89/10463 | 11/1989 |
| WO | 92/13172 | 8/1992 |
| WO | 92/15771 | 9/1992 |

OTHER PUBLICATIONS

Search Report—PCT/GB00/04222.
Preliminary Examination Report—PCT/GB00/04222.

* cited by examiner

*Primary Examiner*—William Neuder
(74) *Attorney, Agent, or Firm*—Patterson, Thuente, Skaar & Christensen, P.A.

(57) ABSTRACT

A method of treating a hydrocarbon-bearing measure such as an oil-bearing rock formation (13). The method comprises: injecting water containing a source of vitamins, phosphates and an electron acceptor such as nitrate into the formation at first location (10) and allowing anaerobic bacteria, which are either already present in the formation (13) or which are introduced simultaneously to multiply using the oil as their main carbon source. This establishes a biomass layer (16) which acts to dissociate the oil from the rock formation (13). The dissociated oil is removed via an outlet (15). The vitamins are supplied by means of a controlled-release medium.

7 Claims, 1 Drawing Sheet

METHOD OF TREATING A HYDROCARBON BEARING FORMATION

FIELD OF THE INVENTION

The present invention relates to a method of treating a hydrocarbon-bearing measure and is particularly applicable to microbial enhanced oil recovery from oil-bearing rock formations.

BACKGROUND OF THE INVENTION

When oil is present in subterranean rock formations such as sandstone or chalk, it can generally be exploited by drilling into the oil-bearing measures and allowing existing overpressures to force the oil up the borehole. This is known as primary removal. When the overpressure approaches depletion, it is customary to create an overpressure, for example by injecting water into the formations to flush out standing oil. This is known as secondary removal.

However, even after secondary removal, a great deal of oil remains in the formations; in the case of North Sea oil, this may represent up to 75% of the original oil present. Of this remaining oil probably more than half will be in the form of droplets and channels adhering to the rock formations that have been water-flooded and the remainder will be in pockets which are cut off from the outlets from the field. The present invention is concerned with the exploitation of the accessible but adhering oil remaining in the rock formations.

A number of enhanced oil recovery methods have been proposed, to address this objective. One approach is to combine pressure with a change in viscosity of the oil and/or water present. Thus, a diluent or $CO_2$ or steam is added to the reservoir to reduce the viscosity of the oil, thereby allowing it to be freed. Alternatively, viscosity-increasing additions such as polymers may be added to the injection water so that the oil is preferentially dislodged. However, the application of $CO_2$ is disadvantageous due to scale formation, the use of steam is only effective in shallow reservoirs of low temperature while the other additives are very costly.

Another approach is to alter the surface tension and capillary forces so that the water under pressure is more accessible to the pores and channels. This may be achieved by alkaline flooding or by means of surfactants. However, these approaches also tend to be costly.

Another approach is in situ combustion. This entails pumping air or oxygen into the formation and igniting the gas/oil present. In theory, the heat produced will mobilise the lighter fractions as a combustion front moves steadily through the formation, with the heavier tars burning. In practice, however, it is almost impossible to control the progress since the gases tend to rise while the water present sinks, resulting in an uneven combustion front.

A fourth approach is microbial enhanced oil recovery (MEOR). This entails the use of micro-organisms such as bacteria to dislodge the oil, and a number of systems have been proposed. In the case of unconsolidated measures, such as oil shales, the oil bearing rock may be pumped as an aqueous slurry to surface settling tanks or reservoirs where it is subjected to aerobic bacteria, as disclosed in U.S. Pat. No. 2,907,389. The availability of oxygen allows the bacteria to multiply, using the oil as a carbon source. In so doing, the bacteria produce surfactants which act to free the oil as droplets. The droplets of oil are less dense than water and so float to the surface. The oil is then removed. Unfortunately, the system cannot conveniently be applied to consolidated rock formations, particularly when they are undersea.

In situ MEOR methods generally fall into two categories, aerobic bacteria systems, as described typically in U.S. Pat. No. 3,332,487 and anaerobic bacteria systems as described in WO 89/10463.

The very existence of oil in a formation means that there cannot be present any anaerobic bacteria which will feed on oil under the prevailing conditions. Thus, in anaerobic bacteria systems, it has been assumed that a source of carbon or "food" must be supplied. However, under these circumstances, the bacteria selected (either deliberately or naturally) will be those most suited under the prevailing conditions to the consumption of the particular food employed. They will not be specifically adapted to have an effect on oil and therefore their action on oil will be as it were a by-product and these anaerobic systems therefore tend to be very slow in achieving the desired liberation of oil.

The absence of any oxygen in oil bearing formations means that if an aerobic system is to be used, then oxygen must be supplied. However, when aerobic bacteria are used and oxygen (or air, containing oxygen) is injected into the formation, the situation is far from satisfactory. Firstly, there is an immediate separation into a gaseous and an aqueous phase, which makes control of the system very difficult and in practice, limits the system to a batch-type operation. Secondly, a great deal of heat is generated, which, in view of the oxygen-rich gaseous phase and the readily available combustible material, presents a considerable risk of explosion. A cooling medium must therefore also be employed.

One way of addressing this is described in WO 92/13172. This reference describes a method of microbial enhanced oil recovery for recovering oil from an oil-bearing second rock formation, the formation including an inlet at a first location and an outlet at a second location, the method comprising: injecting water containing a source of oxygen, capable of yielding at least 5 mg/l free oxygen, into the formation at the first location spaced apart from the second location, allowing micro-organisms, which are either already present in the formation or which are introduced simultaneously with the oxygen containing injection water to multiply using the oil as their main carbon source and the oxygen from the injection water as their main oxygen source thereby establishing a biomass layer which acts to dissociate the oil from the rock formation, the dissociated oil then being removed via the outlet by the injection water.

In this system, on the far side of the injection well, the oxygen becomes the growth limiting factor due to the consumption of oxygen by the micro-organisms. The rate of growth of micro-organisms is of course dependent on the available oxygen. In this system maximum growth is desired and therefore it is desirable to maintain a high oxygen concentration in the injection water (and clearly also in advancing biomass layer). Field trials in Austria in recent years have shown that by the use of this system, it has been possible to obtain a threefold increase in oil production.

However it has been found that this system is effective over only a relatively short distance from the point of oxygen injection. Furthermore, it would be desirable to avoid the use of injected oxygen in order to avoid problems of corrosion. This is particularly acute in situations where the equipment susceptible of corrosion is remote and/or difficult and costly to replace.

It is known that sulphate reducing bacteria (SRB), nitrate reducing bacteria (NRB), iron-reducing bacteria (IRB) and acetogenic bacteria can grow anaerobically on oil if they have the necessary inorganic nutrients. Laboratory studies have shown that oxygen can be substituted by certain growth factors in order to achieve a reduction in residual oil concentration.

The main obstacle in this process is that the growth factors, as with Oxygen, are consumed near the injection point which limits the range of effectiveness of the process.

SUMMARY OF THE INVENTION

It is therefore an object of the present invention to provide method of introducing growth factors deep into a formation to facilitate microbial enhanced oil recovery.

According to the invention, there is provided a method of treating a hydrocarbon-bearing measure, which comprises: bringing micro-organisms into contact with the measure; supplying the micro-organisms with growth factors; allowing the micro-organisms to multiply using the hydrocarbon as their main carbon source, thereby establishing a biomass layer which acts to dissociate the hydrocarbon from the measure; and removing the dissociated hydrocarbon; and in which the growth factors are supplied by means of a controlled-release medium and are distributed through the measure by carrying out their supply over a predetermined period of time.

This technique is particularly suited to the mobilisation and recovery of oil from an oil-bearing rock formation. However it is well adapted to increase efficiency of microbial treatments to remove paraffin, asphalt and scale deposits from production wells, by allowing the process to continue over longer periods. It is also applicable to soil reclamation in the case of hydrocarbon-contaminated soil.

Preferably, the micro-organisms are in the form of anaerobic or facultative anaerobic bacteria. Preferably, the controlled-release medium comprises a porous inert carrier impregnated with the growth factors. Typical carriers might include acrylate and/or slyrene polymeric spheres, in the range of oil to 20 µm preferably 1 to 5 µm. Alternatively, it may comprise micro-capsules containing the growth factors, or any other mechanisms, such as micro-emulsions and micro-pellets.

Typically the growth facts might be vitamins but other organic materials such as organic acids and sugars that can act as vitamin production precursors in situ might be used.

Preferably, the growth factor carrier is injected into the measure using water. Preferably, the injection water also contains a source of phosphates and an electron acceptor. Conveniently, the bacteria are either already present in the measure or are introduced simultaneously with the vitamins, phosphates and electron acceptor.

Preferably, the electron donor is nitrate added as calcium, potassium, sodium or ammonium salt, though sulphates could be employed. Preferably, substantially no oxygen is supplied with the injection water.

The bacteria are oil degrading anaerobic and/or facultative anaerobic bacteria. Preferably, the bacteria substantially comprise species of the genuses of SRB, NRB, IRB and/or acetogenic bacteria.

The time release mechanism will be governed by the diffusion rate/instability of the growth factor within the carrier. Typically, there might be a period of weeks over which a half of the growth factor content will be released. However, the release rate might be relatively constant, since the temperature will tend to increase as the process proceeds, at least over the initial period.

Preferably, the vitamins comprise one or more or a blend of: B12, biotin, folic acid, nicotinic acid, aminobenzoic acid, calcium pantothenate, pyridoxine HCL, riboflavin, Thiamine and Thioctic acid. The vitamins etc. are preferably introduced continuously into the measure. Alternatively, they may be introduced periodically for example once per day.

Preferably, the individual concentration of the vitamins when released into the injection water is in the range of 0.1 to 100 µg/l and more preferably in the range of 1 to 10 µg/l. Preferably, the superficial velocity of the injection water through the measure, where the measure is an oil-bearing formation, is between 0.1 and 15 m/day, more preferably between 0.3 and 2 m/day. The formation may include an inlet and an outlet. Preferably, the inlet is at a first location and the outlet is at a second location spaced apart from the first location, though the inlet and outlet could be one and the same, e.g. the production well is also an injection well having inlet 20 and outlet 25 as depicted in FIG. 1.

As the displaced oil is washed forwards, the micro-organisms at the rear of the front will have no oil and will either become dormant or will feed on each other. This effectively regulates the thickness of the biomass layer ensuring that the vitamins, phosphates and the electron acceptor penetrate to the forward part of the layer, allowing fresh oil to be acted upon. Thus, the front advances through the oil towards the outlet and dislodged oil is constantly being flushed out by the injection water.

By a process of natural selection, only the most successful micro-organisms thrive and these will be the ones most effective in using the oil. They will therefore be the most efficient at dislodging the oil, probably by the production of surfactants. However, due to the flushing action of the injection water, the displaced oil is removed and so only a very small proportion of the oil will actually be consumed by the biomass.

One theory as to how the oil is dissociated is that the oil is split into small droplets by the surfactants and these are washed out. However, the present applicants believe that the oil is initially disposed in long strands or ribbons in the rock pore structure and that the surfactants begin to affect only portions of these strands. In this way, the overall viscous forces attaching a strand will be reduced and the injection water pressure eventually dislodges the entire strand, rather than its being broken up by the surfactants.

The micro-organisms may be any convenient anaerobic and/or facultative anaerobic bacteria. Suitable bacteria may be SRB, NRB, IRB and acetogenic bacteria. The bacteria used may be pre-selected and cultivated to thrive in the injection water under the prevailing conditions.

Examples of suitable nitrates and phosphates include $NaNO_3$, $KNO_3$, $NH_4NO_3$, $Ca(NO_3)_2$, $Na_2HPO_4$, and $K_2HPO_4$. If sulphates are relied upon, these would be naturally present in sea water.

It will be appreciated that by using a system according to the invention, the advancing biomass layer may remove efficiently all the oil it encounters. Either the oil will be dislodged and flushed away or it will be consumed and converted though some may remain. The liberated oil can be separated from the water, minerals and organic material by conventional methods though it is desirable to minimise any pre-separation exposure to air in order to avoid further microbial action on the oil.

BRIEF DESCRIPTION OF THE DRAWINGS

The invention may be carried into practice in various ways and an embodiment will now be described by way of example with reference to the accompanying drawings in which.

DETAILED DESCRIPTION OF THE PREFERRED EMBODIMENTS

Figure 1:
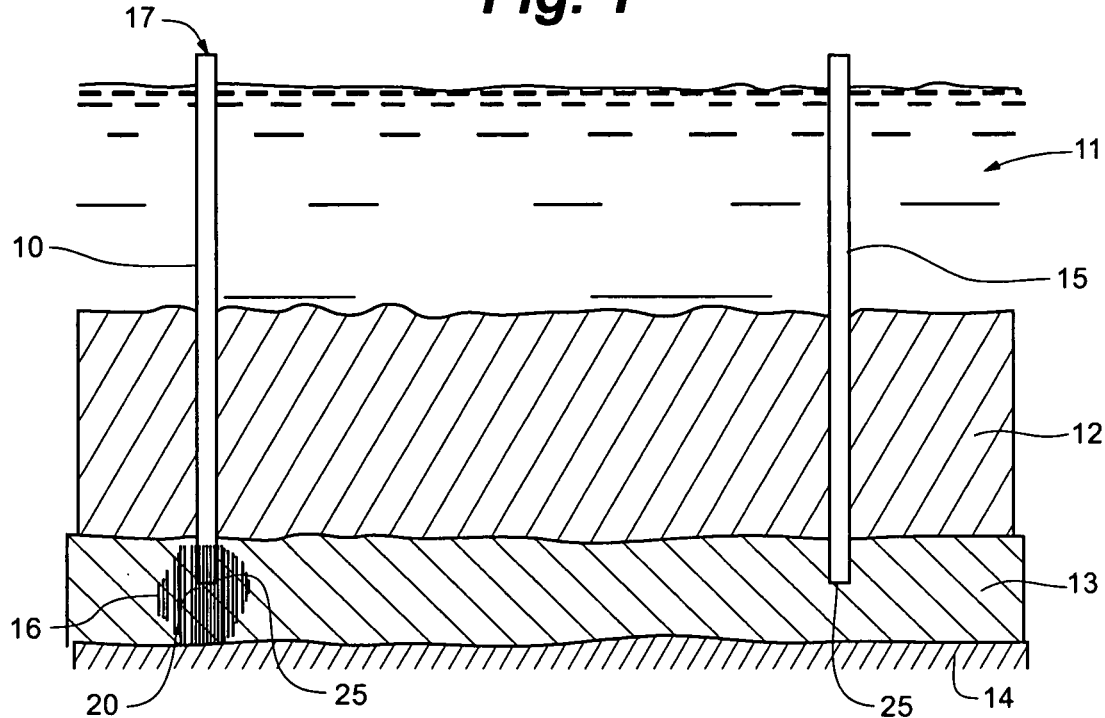
FIG. 1 is a schematic vertical section showing the initiation of a method according to the invention in a residual oil-bearing formation and also shows an optional alternative configuration with the inlet and outlet being the same.

FIG. 1 shows an undersea oil well which has been subjected to primary/secondary removal by means of an injection well 10. Beneath the sea 11 there are various core strata 12, a residual oil bearing formation 13 and an underling bed rock 14. A producing borehole 15 with inlet 20 and the injection borehole 10 with outlet 25 extend into the formation 13. As depicted in FIG. 1, inlet 20 and outlet 25 may be at separate locations or, alternatively, the inlet and outlet could be one and the same, e.g. the production well is also injection well 10 having inlet 20 and outlet 25. In the case of a North Sea oilfield such as the Gullfaks field, the formation 13 might be consolidated sandstone which has a large quantity of adhering oil and which is flooded with formation and injection water containing no oxygen.

Injection water 17 is introduced into the formation 13 via the injection well 10. If there are no suitable anaerobic bacteria present in the formation 13 either naturally or due to operations carried out previously, anaerobic bacteria will be introduced via the injection well 10 e.g. with the injection water 17. The injection water 17 contains vitamins and mineral nutrients comprising nitrates and phosphates, but substantially no oxygen. The vitamins are supported on an inert carrier comprising acrylate polymer spheres. The carrier is arranged to allow the vitamins to be released slowly over time. Thus, as the injection water moves outwards into the formation, the vitamins will be released in a controlled fashion.

When the vitamins and minerals in the injection water 17, the bacteria and the oil come into mutual contact, the bacteria attacks the oil, and multiplies, creating biofilm 16 converting some of the oil to lighter fractions and producing surface active agents or surfactants. The production well 15 acts as a sink and there will be an overall flow of bioorganic matter (biofilm) produced by the micro-organisms, oil and injection/formation water from the injection well 10 towards the production well 15.

The injection water 17 is moving through the formation 13 towards the borehole 15 at a speed of about 0.1–15 m/day carrying the formation/injection water before it. The formation water is removed via outlet 25 at borehole 15. The surfactants produced by the biofilm 16 help to reduce the forces by which the oil is attached to the rock formation and so the flowing injection water 17 actually detaches the oil 18 and this is carried forward through the formation 15.

As the injection water 17 passes through the biofilm 16, the vitamins and minerals are consumed by the multiplying bacteria and the oil is partly consumed but largely detached and carried forward by the injection water. The bacteria at the forward end of the layer encounter adhering oil and so multiply detaching the oil. However, the bacteria at the rear run out of food (oil) and so they die. In this way, the bacteria layer moves steadily through the formation 13 at a rate of about 0.1 to 15 m/day.

Figure 3:
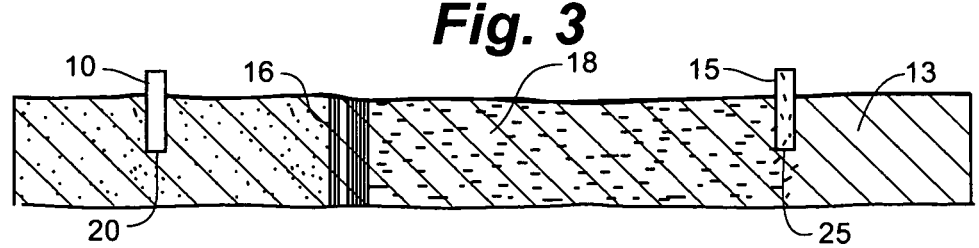

As shown in FIG. 3, the detached oil 18 flows out into the borehole 15 with the injection water. This is recovered at the surface and separation is carried out in a known manner.

Figure 4:
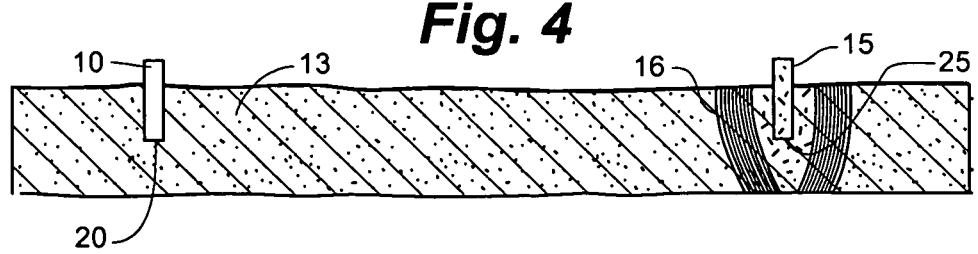

Eventually, the biofilm 16 reaches the borehole 15 and the well is shut down as shown in FIG. 4. The formation 13 will then be depleted of the oil previously adhering there.

Figure 2:
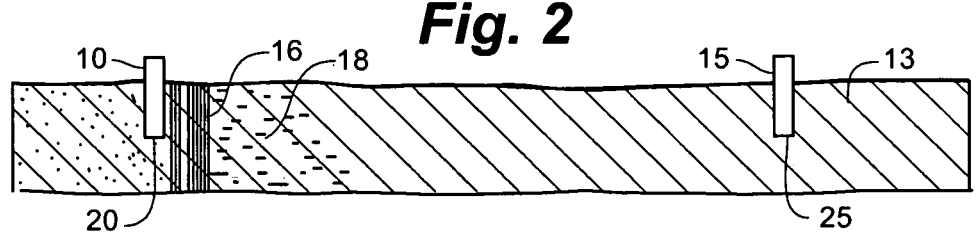
FIGS. 2 to 4 are similar simplified views showing sequential steps in the process depicted as being initiated in FIG. 1.

While FIGS. 1 to 3 show the effect of the invention in one dimension, it will be appreciated that in practice, the situation would be a good deal more complex. In particular, the bacteria 16 would be arranged to converge on the borehole 15 from many or all directions, as depicted schematically in FIG. 4. Furthermore, there would probably be a number of boreholes, which would be in use simultaneously.

The invention claimed is:

1. A method of treating a hydrocarbon-bearing measure, which comprises:
   bringing micro-organisms into contact with the measure;
   supplying the micro-organisms with growth factors;
   allowing the micro-organisms to multiply using the hydrocarbon as their main carbon source, thereby establishing a biomass layer which acts to dissociate the hydrocarbon from the measure;
   recovering the dissociated hydrocarbon;
   in which the growth factors are supplied by means of a controlled-release medium, are distributed through the measure by carrying out their supply over a predetermined period of time and are injected into the measure using water; and
   in which substantially no oxygen is supplied with the injected water.

2. A method of treating a hydrocarbon-bearing measure, which comprises:
   supplying anaerobic micro-organisms in the measure with growth factors;
   allowing the micro-organisms to multiply using the hydrocarbon in the measure as a main carbon source, thereby establishing a biomass layer which acts to dissociate the hydrocarbon from the measure;
   and recovering the dissociated hydrocarbon;
   and in which the growth factors are supplied in a controlled-release medium that releases the growth factors to the measure over a predetermined period of time and the controlled-release medium comprises a porous inert carrier of less than about 20 μm in maximum dimension impregnated with the growth factors.

3. The method of claim 2 wherein substantially no oxygen is supplied with water injected into the well.

4. The method of claim 2 wherein the micro-organisms are bacteria that comprise sulphate-reducing bacteria, nitrate-reducing bacteria, iron-reducing bacteria or acetogenic bacteria.

5. The method of claim 2 wherein the growth factor comprises vitamins.

6. The method of claim 2 wherein the micro-organisms produce surfactants which act to dislodge the oil.

7. The method of claim 2 comprising bringing the micro-organisms into contact with the measure.

* * * * *

UNITED STATES PATENT AND TRADEMARK OFFICE
CERTIFICATE OF CORRECTION

| | | |
|---|---|---|
| PATENT NO. | : 7,124,817 B1 | Page 1 of 1 |
| APPLICATION NO. | : 10/129495 | |
| DATED | : October 24, 2006 | |
| INVENTOR(S) | : Sunde | |

It is certified that error appears in the above-identified patent and that said Letters Patent is hereby corrected as shown below:

Column 3, Line 42:

Delete "facts" and insert --factors--.

Column 5, Line 44:

Delete "minerals" and insert --are--.

Signed and Sealed this

Twenty-first Day of August, 2007

JON W. DUDAS
*Director of the United States Patent and Trademark Office*